(12) United States Patent
Mueller

(10) Patent No.: US 11,747,190 B2
(45) Date of Patent: Sep. 5, 2023

(54) METHOD FOR CALIBRATING AN APPARATUS FOR MEASURING A PROCESS VALUE OF AT LEAST ONE SUBSTANCE, METHOD FOR MEASURING A PROCESS VALUE OF AT LEAST ONE SUBSTANCE BY AN APPARATUS, AND SYSTEM

(71) Applicant: Berthold Technologies GmbH & Co. KG, Bad Wildbad (DE)

(72) Inventor: Steffen Mueller, Pforzheim (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 260 days.

(21) Appl. No.: 17/343,094

(22) Filed: Jun. 9, 2021

(65) Prior Publication Data
US 2021/0389168 A1    Dec. 16, 2021

(30) Foreign Application Priority Data
Jun. 10, 2020    (EP) ..................... 20179373

(51) Int. Cl.
*G01F 25/20*    (2022.01)
*G01F 23/288*    (2006.01)
*G01N 9/24*    (2006.01)

(52) U.S. Cl.
CPC ............ *G01F 25/20* (2022.01); *G01F 23/288* (2013.01); *G01N 9/24* (2013.01)

(58) Field of Classification Search
None
See application file for complete search history.

(56) References Cited

U.S. PATENT DOCUMENTS

| | | |
|---|---|---|
| 4,590,479 A | 5/1986 | Ben-Dov |
| 5,390,544 A | 2/1995 | Madras |
| 2005/0129178 A1 | 6/2005 | Pettit |
| 2013/0261974 A1 | 10/2013 | Stewart et al. |
| 2020/0249369 A1* | 8/2020 | Qiang ..................... G01T 7/005 |
| 2020/0367839 A1* | 11/2020 | Iniewski ................ A61B 6/037 |

FOREIGN PATENT DOCUMENTS

DE    10 2013 215 606 A1    2/2015

* cited by examiner

*Primary Examiner* — Edwin C Gunberg
(74) *Attorney, Agent, or Firm* — Crowell & Moring LLP

(57) ABSTRACT

A method for calibrating an apparatus includes, in the case of a known process value, measuring a detector value of a first type only based on captured gamma rays that are not scattered or are scattered little; calculating a calibration assignment based on a process model; in the case of at least one unknown process value, measuring a detector value of the first type and measuring a detector value of a second type at least based on captured gamma rays that are scattered; determining the unknown process value by using the calculated calibration assignment based on the measured detector value of the first type; and modifying the calibration assignment by assigning the measured detector value of the second type to the determined process value.

15 Claims, 4 Drawing Sheets

KT ↗ b)

| PW, FW | DW, ZW [CPS] | DW1, ZW1 [CPS] | DW2, ZW2 [CPS] |
|---|---|---|---|
| 0% | 5928 | | |
| 10% | 5894 | | |
| 20% | 5706 | | |
| 30% | 5384 | | |
| 40% | 4938 | | |
| 50% | 4411 | | |
| 60% | 3137 | | |
| 70% | 2599 | | |
| 80% | 1852 | | |
| 90% | 913 | | |
| 100% | 0 | | |

| PW, FW | DW, ZW [CPS] | DW1, ZW1 [CPS] | DW2, ZW2 [CPS] |
|---|---|---|---|
| 0% | 5928 | 6813 | ? |
| 10% | 5894 | 6774 | ? |
| 20% | 5706 | 6558 | ? |
| 30% | 5384 | 6188 | ? |
| a) → 40% | 4938 | 5675 | ? |
| 50% | 4411 | 5069 | ? |
| 60% | 3137 | 3605 | ? |
| 70% | 2599 | 2987 | ? |
| 80% | 1852 | 2128 | ? |
| 90% | 913 | 1049 | ? |
| 100% | 0 | 0 | ? |

Fig. 4

METHOD FOR CALIBRATING AN APPARATUS FOR MEASURING A PROCESS VALUE OF AT LEAST ONE SUBSTANCE, METHOD FOR MEASURING A PROCESS VALUE OF AT LEAST ONE SUBSTANCE BY AN APPARATUS, AND SYSTEM

CROSS REFERENCE TO RELATED APPLICATION

This application claims priority under 35 U.S.C. § 119 from European Patent Application No. 20179373.4, filed Jun. 10, 2020, the entire disclosure of which is herein expressly incorporated by reference.

BACKGROUND AND SUMMARY OF THE INVENTION

The invention relates to a method for calibrating an apparatus for measuring a process value of at least one substance, to a method for measuring a process value of at least one substance by using an apparatus, and to an, in particular associated, system.

Radiometric measurement systems can be used for example to measure a process value, such as for example a filling level or a density. For this purpose, measurement values or detector values are recorded, which can be converted by way of a suitable calibration. Such calibrations are performed or carried out in known procedures typically in a final installation situation, generally at the customer end. To this end, at least one process value typically needs to be realized, wherein for example a filling level is established or a density is measured in the laboratory so that a count rate can be recorded herefor. The greater the number of different process values that can be used for the calibration, the better the system can be calibrated.

However, in reality, it is often not possible or too complicated to establish arbitrarily different process values. Therefore, typical calibrations consist of a few calibration points and a model assumption such as for example linear or exponential. The assignment of the process value is then realized using model-appropriate interpolation between the existing calibration points. In the extreme case, calibrations with only one value are realized, which can also be referred to as one-point calibration. This can be used for example if an ongoing process cannot be interrupted.

Any deviation from the model assumption represents a measurement error that could have been avoided with a good calibration. The deviations become ever greater as the number of calibration points that can be measured decreases.

One significant reason for a deviation between the model and reality is scattered radiation. A model assumption can be based for example on the fact that only mono-energetic gamma rays contribute to the measurement effect. However, gamma rays scatter differently in reality. Depending on the measurement construction and the surrounding materials, the number of the scattered gamma rays varies. This scattered radiation therefore can be modeled only with difficulty because the parameters are varied and differ for each application.

Ultimately, a compromise between measurement accuracy and complexity during start-up is therefore typically accepted in known embodiments.

It is therefore an object of the invention to provide a method that has an alternative or better embodiment compared to known embodiments, which for example makes a high accuracy of the calibration possible with a low calibration complexity. It is furthermore an object of the invention to provide an, in particular associated, method for measuring a process value of at least one substance by using an apparatus. It is additionally an object of the invention to provide an, in particular associated, system.

This object is achieved according to the claimed invention.

The invention relates to an, in particular automatic, method for the, in particular automatic, calibration of an, in particular electrical and/or radiometric, apparatus for measuring a process value of at least one substance, in particular arranged within a hollow body. The process value can be in particular a filling level or a density.

The apparatus comprises or has an, in particular electrical and/or gamma energy-sensitive, detector device, wherein the detector device is embodied or configured for, in particular automatically, measuring a detector value by, in particular automatically and/or gamma energy-sensitively, capturing gamma rays that have at least partially penetrated at least the substance, in particular and the hollow body, and of, in particular automatically, producing the detector value based on the captured gamma rays.

The method comprises or includes the following steps:
a) in the case of, in particular only one, in particular single, known process value, measuring, in particular automatically measuring, in particular only one, in particular single, detector value of a first type only or exclusively based on captured gamma rays that are not scattered or are scattered little,
b) calculating, in particular automatically and/or analytically calculating, a calibration assignment or a calibration table based on an, in particular mathematical, process model, in particular by using the process model, wherein the process model is based on a description of the penetration only or exclusively taking into account unscattered gamma rays, in particular describes the penetration only taking into account unscattered gamma rays, and based on, in particular only, the, in particular single, measured detector value of the first type, in particular and, in particular only, the, in particular single, known process value, wherein the calibration assignment assigns in each case an, in particular different, detector value of the first type to different, in particular unknown, process values,
c) in the case of at least one unknown process value, which is in particular different from the known process value, in particular the different process values, measuring, in particular automatically measuring, an, in particular further, detector value of the first type and measuring, in particular automatically measuring, a detector value of a second type, which is in particular different from the detector value of the first type, at least based on captured gamma rays that are scattered or scattered more, in particular and not scattered little,
d) determining, in particular automatically determining, the unknown process value by using the calculated calibration assignment based on the measured, in particular further, detector value of the first type, and
e) modifying, in particular automatically modifying, or supplementing the calibration assignment by assigning the measured detector value of the second type to the determined process value.

It is in particular possible by using this method to initially create the calibration assignment in a particularly simple manner, in particular for which no complex calculations are necessary, since only unscattered gamma rays are taken into account by the process model. It is thereby possible to achieve a significant saving in terms of calculation time in particular compared to process models that also take into account scattered gamma rays. The calibration assignment, which has in particular been thus obtained, is initially used to assign a respective process value to detector values of the first type. In this way, a basic calibration is achieved, which offers a certain level of accuracy. For the initial calculation of the calibration assignment, only the establishment of a known process value is necessary, wherein the calibration assignment that is obtained based on the process model is here typically normalized or scaled such that the detector value of the first type that is obtained in the case of the known process value results in the associated process value. This can be done by a simple normalization or scaling of the obtained values. If unknown process values are then established, they can be ascertained by using the calibration assignment and the detector values of the first type, and corresponding detector values of the second type can be assigned to the process value that is then known. In this way it is possible over time to modify the calibration assignment in a manner such that, in addition to the initial assignment between detector values of the first type and process values, an assignment between detector values of the second type, that is to say those taking into account scattering, and process values is also present, which allows a more accurate determination of process values.

Instead of a substance, it is for example also possible to refer to a material.

The detector device can have for example at least one photomultiplier, in particular at least one silicon photomultiplier.

The known process value can be, but in particular does not have to be, different from zero, in particular greater than zero.

Step a) can include: in the case of a plurality of known process values, measuring a plurality of detector values of the first type only based on captured gamma rays that are not scattered or are scattered little, and step b) can include: calculating the calibration assignment, in particular in each case partially, based on the process model and based on the, in particular respective, plurality of measured detector values of the first type, in particular and the, in particular respective, plurality of known process values.

Regarding the calculation of the calibration assignment, in particular by using the process model, reference is made to the specialist literature and to what will be stated below.

The calibration assignment can assign the measured detector value of the first type to the known process value.

The detector value of the second type can additionally be based on captured gamma rays that are not scattered or are scattered little.

It should be noted that in addition to the scattering criterion described here, at least one further criterion is possible, such as for example a temperature criterion.

Step b) can be performed at the same time as and/or temporally after step a). In particular, the calibration assignment can be calculated by using the process model, temporally after this the detector value of the first type can be measured in the case of the known process value, and temporally after this the calibration assignment can be calculated, in particular re-calculated, in particular normalized, based on the measured detector value of the first type. Additionally or alternatively, step c) can be carried out temporally after step b). Further additionally or alternatively, step d) can be carried out temporally after step c). Further additionally or alternatively, step e) can be carried out temporally after step d).

The process value can be of the same type or can be an identical, in particular physical, variable, such as for example a filling level value or a density value.

According to one embodiment, the process value can be a filling level value or a density value. For process values of this type, the method described here has proven to be particularly advantageous. However, it is also possible to use other process values.

According to one embodiment, the detector value can be a count rate value or be dependent on the count rate value, in particular proportional to the count rate value. For example, gamma rays or quanta that are incident within a specific time interval can be captured and the count rate value can be formed therefrom. Depending on the application, in a specific time interval, the less gamma rays or quanta are scattered by the substance, the more or the fewer of them are incident.

According to one embodiment, the method can comprise or include:
measuring the detector values of the first type in each case only based on captured gamma rays having gamma energies, in particular gamma energy values, that are the same as or greater than, in particular and not smaller than, a first energy threshold value, and
measuring the detector value of the second type at least based on captured gamma rays having gamma energies, in particular gamma energy values, that are smaller than, in particular and not the same as or not greater than, the first energy threshold value.

In this way it is possible to ensure that exclusively or at least substantially only gamma rays that are not or have not been scattered or that are or have been scattered little are used for the detector value of the first type. Accordingly, it is possible to ensure for the detector value of the second type that in this case gamma rays that have been scattered, in particular scattered more, are also taken into account. In particular, the method can include: measuring the detector value of the second type additionally based on captured gamma rays having gamma energies, in particular gamma energy values, that are the same as or greater than, in particular and not smaller than, the first energy threshold value.

According to one embodiment, the method can comprise or include:
measuring the detector values of the first type in each case only based on captured gamma rays having gamma energies, in particular gamma energy values, that are the same as or greater than a first, in particular the first, energy threshold value, wherein the first energy threshold value is at least 0.5 times, in particular identical to, a Compton energy value of a Compton gap of the, in particular captured, gamma rays.

This, in particular the energy threshold value being identical to the Compton energy value, has proven to be a particularly expedient procedure for capturing gamma rays that are scattered only a little, in particular that are non-scattered or unscattered. In particular, a Compton gap in a spectrum of a respective frequency, in particular count rate, above a respective energy of gamma rays after penetrating or passing through a substance is typically a gap directly below a peak that indicates the maximum energy, that is to say an energy corresponding to an emission or exit energy from the radiation source. Significant frequencies, in particular count rates, in the spectrum only occur again below the Compton gap, that is to say at lower energies than the maximum peak minus the Compton gap. Within the Compton gap lies the Compton energy value, which can typically be defined as the energy value at a minimum frequency, in particular count rate, within the Compton gap or else as a minimum of a fitted, for example U-shaped, function within the Compton gap. In particular a delineation between gamma rays that have not scattered and thus have an energy above the Compton energy value and gamma rays that have scattered and thus have an energy below the Compton energy value is thus realized.

According to one embodiment, the detector device can have or comprise a detector noise having a noise energy value, and the method can include or comprise:

measuring the detector value of the second type, in particular and the detector value of the first type, only based on captured gamma rays having gamma energies, in particular gamma energy values, that are the same as or greater than, in particular and not smaller than, a second energy threshold value, wherein the second energy threshold value is equal to or greater than the noise energy value.

It is possible in this way to avoid that the detector noise falsifies the measurement.

According to one embodiment, the method can include or comprise the following step:

emitting the gamma rays with, in particular only, one, single, discrete isotope gamma energy, in particular a discrete isotope gamma energy value, into at least the substance, in particular and the hollow body, by using at least one radiation source.

This permits an expedient procedure, in which gamma rays having a known output energy are available. In particular, the Compton energy value may be smaller than the isotope gamma energy. It should be noted that isotopes used in the radiation source may also have not only one energy but can also have, for example, two discrete energies. In particular, the first energy threshold value can be selected or set based on the higher discrete energy. Additionally or alternatively, the two discrete energies can be so close to one another that they can be treated as one discrete energy with respect to the first energy threshold value, such as for example for cobalt-60. Mixed isotopes can also be used.

According to one embodiment, the detector device can have or comprise at least one scintillator for capturing gamma rays. The scintillator can have a density of at least 3 grams per cubic centimeter ($g/cm^3$), in particular of at least 5 $g/cm^3$, and/or of at most 20 $g/cm^3$, in particular of at most 10 $g/cm^3$, in particular of 7 $g/cm^3$. In particular, the scintillator can consist in part or entirely of at least one element having the atomic number (Z) of equal to or greater than 31, 39, 48, 53, 55 or 57. Such densities, in particular such elements, have proven to be advantageous for the detection purposes that are relevant here, in particular because the respective energy of gamma rays is deposited therein completely with a higher probability. In particular, bismuth germanate (BiGeO) and/or lanthanum bromide (LaBr) and/or cesium iodide (CsI) and/or lutetium-yttrium oxyorthosilicate (LuYSiO) and/or cadmium tungstate (CdWo) and/or gadolinium aluminum gallium oxide (GdAlGaO) can be used. They can be used for example alone or else in combination in the detector device.

According to one embodiment, the method can include or comprise the following steps:

in the case of the known process value, measuring, in particular automatically measuring, an, in particular further, detector value of the second type, and in the calibration assignment, assigning, in particular automatically assigning, the measured, in particular further, detector value of the second type to the known process value.

In this way it is already possible to capture a detector value of the second type in the case of the known process value and to use it for the calibration.

According to one embodiment, the previously mentioned step b) can include or comprise, in particular consist of, in particular only:

normalizing, in particular automatically normalizing, or scaling the calibration assignment based on the measured detector value of the first type.

This has proven to be a simple and expedient procedure for a first calibration.

According to one embodiment, the assignment of the measured detector value of the second type to the process value can be carried out or performed if the detector value of the second type is measured as reaching, in particular exceeding, an, in particular prescribed, statistical threshold value. It is possible thereby to ensure that only detector values of the second type that have reached the statistical threshold value are used, with the result that detector values of the second type that are based on a number of detection results that is too low are not, in particular yet, used.

According to one embodiment, the calibration can be carried out or performed until a detector value of the second type is assigned in each case to different process values at intervals from one another that in each case reach, in particular fall below, an, in particular prescribed, interval maximum value. It is thereby possible for the calibration to be continued until a sufficient number of detector values of the second type with associated process values are available in order to realize an accurate assignment based on detector values of the second type. Subsequently, the calibration functionality can be terminated. It is in particular possible to perform interpolation and/or fitting between the process values at intervals from one another that in each case reach, in particular fall below, the interval maximum value and/or the, in particular assigned, detector values of the second type.

The invention furthermore relates to an, in particular automatic, method for, in particular automatically, measuring an, in particular the, process value of at least one, in particular the at least one, substance, in particular arranged within an, in particular the, hollow body, by using an, in particular the, apparatus, wherein the method includes or comprises the following:

an, in particular the, method for calibrating the apparatus as described above, and measuring the process value by measuring the detector value of the second type and of determining the process value by using the modified calibration assignment based on the measured detector value of the second type.

The process value can thereby be determined by way of the use of detector values of the second type, wherein the calibration is based on the method described above. If a sufficient number of detector values of the second type is not yet available or there are no entries that are close enough in the calibration assignment for a determined detector value of the second type, it is possible to use detector values of the first type to determine the process value. It is possible in this case for the calibration to be carried out further as described above, with the result that more detector values of the second type are subsequently assignable.

The invention furthermore relates to an, in particular electrical and/or radiometric, system, in particular measurement system, wherein the system has an, in particular the, apparatus for measuring an, in particular the, process value of at least one, in particular the at least one, substance, in particular arranged within an, in particular the, hollow body, and wherein the system is embodied or configured for, in particular automatically, carrying out an, in particular the, method as described above. Regarding the method, it is here possible to use all the embodiments described above.

According to one embodiment, the system can have or comprise an, in particular the, hollow body and/or at least one, in particular the at least one, radiation source, which is embodied or configured for emitting, in particular the, gamma rays having an, in particular the, discrete isotope gamma energy into at least the substance, in particular and the hollow body.

In particular, the hollow body can have, in particular be, a container, in particular a pipe.

The method according to embodiments of the invention can be carried out advantageously by using the described system. The advantages that have already been described can be attained in this case.

In principle, it should be noted that for example analytical methods are known that calculate calibration assignments. With the analytical approach, the results are typically available within a few minutes. However, typically only the mono-energetic gamma rays are taken into consideration here, wherein scatterings are typically dealt with not at all or only by way of inadequate correction factors. Deviations in the shape of the calibration curve should therefore be expected.

With the aid of complex computer simulations based, for example, on a Monte Carlo simulation, which presupposes a detailed description of the geometry, such as dimensions and material description, it is possible to pre-calculate a realistic calibration assignment. Even with parallelized computing structures, the computer simulation itself typically requires several hours to a few days of computation time, which is why it is typically not yet practicable for widespread use.

By using the method/s disclosed herein, the particularly complex computer simulation or the correction factor does not need to be or may not be necessary, and it is nevertheless possible to achieve a comparable accuracy of the modified calibration assignment.

In principle, it is possible in an, in particular the, detector device to measure the energy properties of detected gamma radiation. In this case it is possible to measure in an, in particular first, measurement channel (FE channel; FE=full energy) initially only those gamma rays that also satisfy the, in particular analytical, process model. These are for example all gamma rays that have not scattered and thus still have the full energy of the emitting radiation source, in particular of the emitting isotope. The number of the gamma rays can now be pre-calculated exactly, analytically as a function of the process value, such as filling level or density. However, it has been found that typically only a small count rate occurs here, since the plurality of the gamma rays have scattered before they reach the detector device. Therefore, the statistical accuracy is also reduced.

This disadvantage can be compensated for as follows. It is possible to measure all gamma rays, that is to say even the scattered gamma rays having a lower energy, in a second measurement channel (MK channel). This second measurement channel possesses the full measurement statistics but also the inaccuracy owing to model errors due to the scattered gamma rays. It is now possible to use the correct but statistically inaccurate measurement value from the FE channel to learn the modified calibration assignment for the MK channel. The values of the modified calibration assignment, in particular the detector values of the second type, can be continuously assigned to the values, in particular the process values, of the calculated calibration assignment, depending on the process value that the FE channel is currently measuring. With this method, the accuracy offered by a calibration with a plurality of measurement points is thus combined with the speed that a pre-calculated calibration offers.

Further advantages and aspects of the invention are evident from the claims and from the following description of preferred exemplary embodiments of the invention which are explained below with reference to the figures, in which:

BRIEF DESCRIPTION OF THE DRAWINGS

FIG. 3 shows the calibration assignment of FIG. 2.

FIG. 4 shows the calibration assignment of FIG. 3 normalized by the method according to embodiments of the invention for calibrating.

DETAILED DESCRIPTION OF THE DRAWINGS

Figure 1:
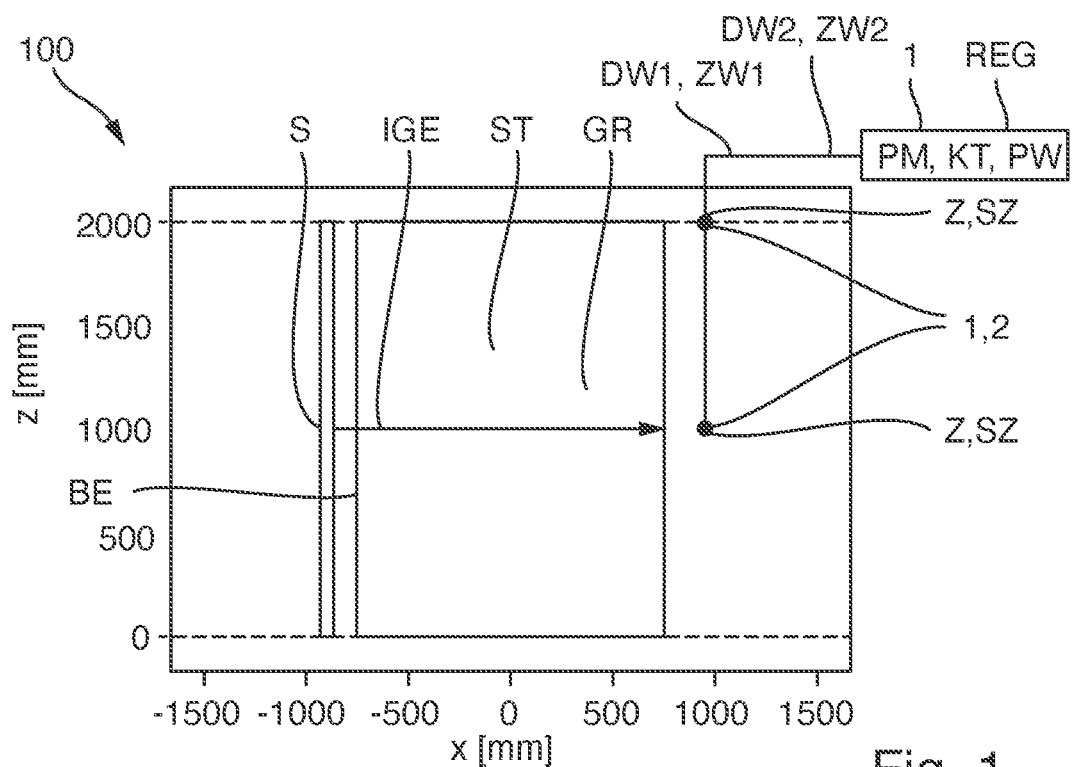
FIG. 1 shows a view of a system according to embodiments of the invention having an apparatus and of a method according to embodiments of the invention for calibrating the apparatus and of a method according to embodiments of the invention for measuring by using the apparatus.

FIG. 1 shows a system 100 according to embodiments of the invention. The system 100 has an apparatus 1 for measuring a process value PW of at least one substance ST, in particular arranged within a hollow body BE.

Specifically, the system 100 has the hollow body BE.

The system 100 additionally has at least one radiation source S, in the exemplary embodiment shown only a single radiation source and/or in the form of a tubular radiation source, which is embodied for emitting gamma rays GR having a discrete isotope gamma energy IGE into at least the substance ST.

In the exemplary embodiment shown, cesium-137 (Cs-137) is used for the at least one radiation source S. The discrete isotope gamma energy IGE is thus 662 keV.

The apparatus 1 furthermore has a detector device 2. The detector device 2 is embodied for measuring a detector value DW by capturing gamma rays GR that have at least partially penetrated at least the substance ST, and for producing the detector value DW based on the captured gamma rays GR.

Specifically, the detector device 2 has at least one scintillator SZ, in the exemplary embodiment shown two scintillators SZ, for capturing the gamma rays GR. The scintillator SZ has a density of at least 3 $g/cm^3$, in particular of at least 5 $g/cm^3$, and/or of at most 20 $g/cm^3$, in particular of at most 10 $g/cm^3$, in particular of 7 $g/cm^3$.

In the exemplary embodiment shown, the at least one radiation source S is located on a side, in particular circumferential side, of the hollow body BE. The detector device 2 is located on another, in particular opposite, side, in particular circumferential side, of the hollow body BE.

In addition, the system 100 is embodied for carrying out a method according to the invention.

Figure 2:
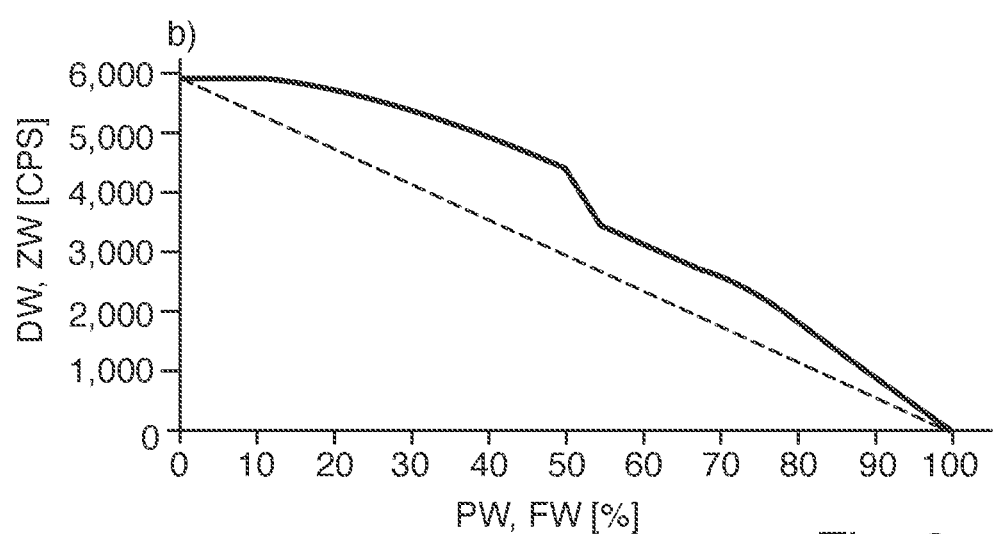
FIG. 2 shows an unnormalized calibration assignment of detector values of the first type to process values calculated by the method according to embodiments of the invention for calibrating.
Figure 5:
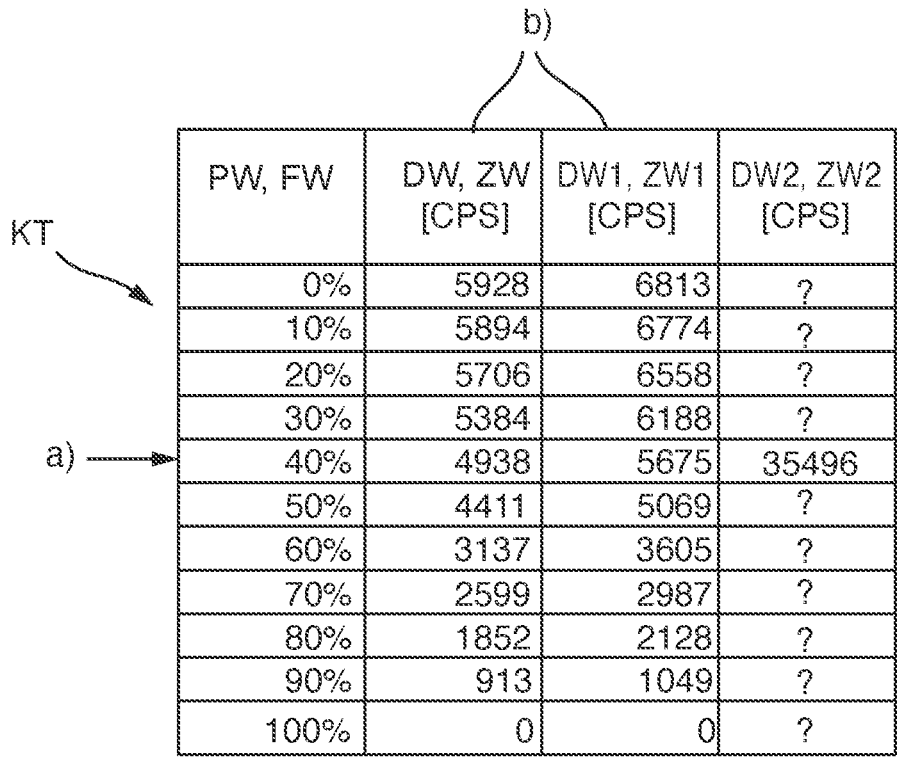
FIG. 5 shows the calibration assignment of FIG. 4 modified by the method according to embodiments of the invention for calibrating.
Figure 6:
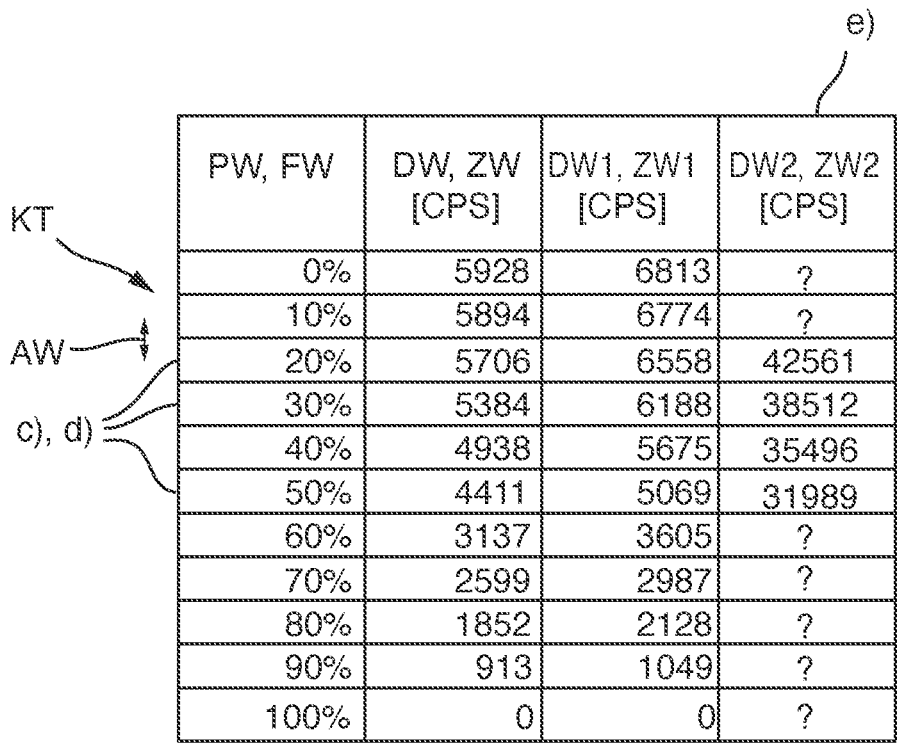
FIG. 6 shows the calibration assignment of FIG. 5 modified again by the method according embodiments of to the invention for calibrating.

FIGS. 1 to 7 show the method according to embodiments of the invention for calibrating the apparatus 1 for measuring the process value PW of the at least one substance ST. The method includes the steps of:

a) in the case of a known process value PW, measuring a detector value DW1 of a first type only based on captured gamma rays GR that are not scattered or are scattered little, in particular by using the detector device 2, as shown in FIGS. 4 and 5, b) calculating a calibration assignment KT based on a process model PM, wherein the process model PM is based on a description of the penetration only taking into account unscattered gamma rays GR, and based on the measured detector value DW1 of the first type, wherein the calibration assignment KT assigns in each case a detector value DW1 of the first type to different process values PW, in particular by using a computation device REG of the apparatus 1, as shown in FIGS. 2 to 4, c) in the case of at least one unknown process value PW, measuring a detector value DW1 of the first type and measuring a detector value DW2 of a second type at least based on captured gamma rays GR that are scattered or scattered more, in particular by using the detector device 2, as shown in FIG. 6, d) determining the unknown process value PW by using the calculated calibration assignment KT based on the measured detector value DW1 of the first type, in particular by using the computation device REG, as shown in FIG. 6, and e) modifying the calibration assignment KT by assigning the measured detector value DW2 of the second type to the determined process value PW, in particular by using the computation device REG, as shown in FIG. 6.

Specifically, the method includes the step of:

emitting the gamma rays GR with the discrete isotope gamma energy IGE into at least the substance ST by using the at least one radiation source S.

It is furthermore possible by using the knowledge regarding the measurement geometry, in particular respective positions and/or respective dimensions of the at least one radiation source S, of the hollow body BE and/or of the detector device 2, to calculate, based on the, in particular simple, process model PM, how many gamma rays GR should be incident on the detector device 2.

The detector device 2 is embodied for capturing the incident gamma rays GR in an energy-selective manner. It can thus differentiate between whether an incident gamma quantum GR has the full isotope gamma energy, that is to say has not scattered, or has a lower energy. The latter indicates that at least one scattering operation is present.

The detector value DW1 of the first type, in particular a count rate value ZW1 of the first type, can be formed from gamma rays GR that have the full or maximum energy. It is likewise possible to form a detector value DW2 of the second type, in particular a count rate value ZW2 of the second type, from gamma rays GR that do not have the full energy, but in particular have an energy that is the same as or greater than a noise energy value NE. This applies both to the calculation by using the process model PM and also to the actual carrying out or performance.

Figure 7:
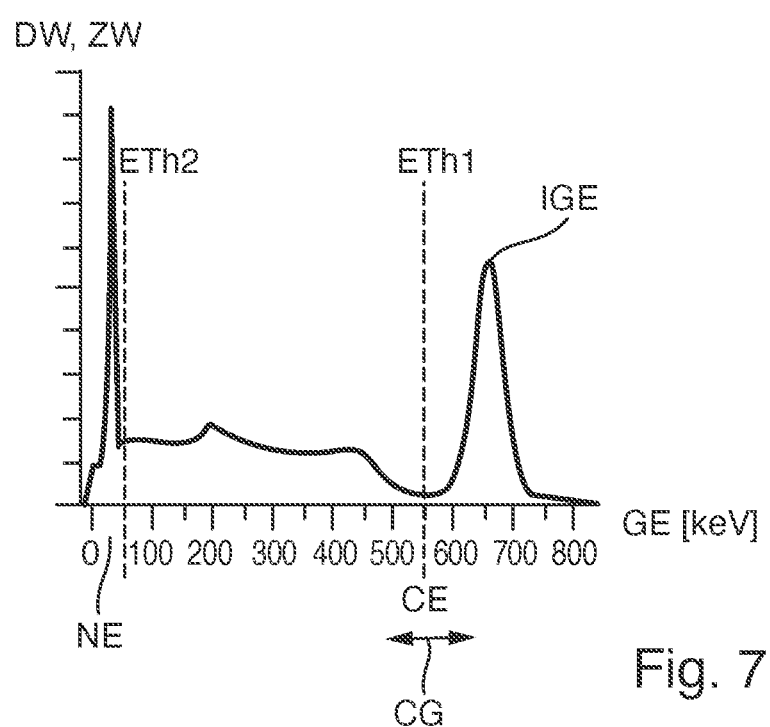
FIG. 7 shows an energy spectrum of gamma rays.

In other words:

The method includes:

measuring the detector values DW1 of the first type in each case only based on captured gamma rays GR having gamma energies GE that are the same as or greater than a first energy threshold value ETh1, and measuring the detector value DW2 of the second type at least based on captured gamma rays GR having gamma energies GE that are smaller than the first energy threshold value ETh1, as shown in FIG. 7.

In addition, the method includes:

measuring the detector values DW1 of the first type in each case only based on captured gamma rays GR having gamma energies GE that are the same as or greater than the first energy threshold value ETh1, wherein the first energy threshold value ETh1 is at least 0.5 times that of, in FIG. 7 the same as, a Compton energy value CE of a Compton gap CG of the gamma rays GR.

The detector device 2 furthermore has a detector noise with the noise energy value NE.

The method includes:

measuring the detector value DW2 of the second type only based on captured gamma rays GR having gamma energies GE that are the same as or greater than a second energy threshold value ETh2, wherein the second energy threshold value ETh2 is equal to or greater than the noise energy value NE.

FIG. 2 shows typical profiles of detector values DW, in particular count rate values ZW, (vertical axis) as a function of process values PW (horizontal axis), for example filling level values FW. The solid line here shows an actual system curve that would thus be obtained in an ideal calibration. The dashed line shows an assumed curve based on only two defining points.

FIG. 3 shows the calibration assignment KT, in which a respective calculated FE rate, that is to say a calculated detector value, in particular count rate value ZW (CPS=counts per second), at full energy, is assigned to each process value PW between 0% and 100% at intervals of 10%. The indicated values originate from the calculation, which is easily performable, by using the process model PM. The other two columns, which denote a normalized FE rate (at full energy IGE) and an MK rate (which also takes into account scattered gamma rays), have not yet been filled in.

Initially, a process value PW of 40%, for example, which is known, is now established. The FE rate DW1, ZW1 is measured at this process value PW, and the calculated rate ZW is normalized or scaled such that the measured value DW1, ZW1 at the known process value PW of 40% corresponds to the table entry. The other table entries are accordingly normalized or scaled as well. This produces the calibration assignment KT illustrated in FIG. 4, in which a further column with detector values DW1, in particular count rate values ZW1, of the first type, which should be expected at full energy for the respective process values PW, is given.

In other words:

step b) includes: normalizing the calibration assignment KT based on the measured detector value DW1 of the first type.

In principle it is now possible to start up the detector device 2 and to fill the hollow body BE with a substance ST, which is used no longer separately for the calibration but as part of a normally running process. If in the process for example the already known process value PW of 40% is established, which can be easily seen by way of the normalized FT rate DW1, ZW1, the detector value DW2 of the second type can be measured and the corresponding value can be entered into the right-hand column of the calibration assignment KT. The corresponding calibration assignment is illustrated in FIG. 5.

If further process values PW are established, which come about in particular as part of the normal use of the hollow body BE, the corresponding process values PW can be captured with the aid of the normalized FE rate DW1, ZW1, and the MK rate DW2, ZW2, that is to say the rate taking into account all the energy that is the same as or greater than the noise energy value NE, can be measured. Corresponding values DW2, ZW2 can be entered into the last column, so that the latter successively receives more entries. The exemplary calibration assignment KT is illustrated in FIG. 6, wherein four corresponding values DW2, PW2 are already given. It is now possible to dynamically switch between the FT rate DW1, ZW1 and the MK rate DW2, PW2. As soon as the MK rate DW2, ZW2 has sufficient entries that are statistically usable, the MK rate DW2, ZW2 is used for the process value determination. A greater accuracy is achieved in this way. Where empty entries are still present in the MK rate DW2, ZW2, the FT rate DW1, ZW1 is used for the process value determination and the MK rate DW2, ZW2 is learned.

In other words:
the assignment of the measured detector value DW2 of the second type to the process value PW is carried out if the detector value DW2 of the second type is measured as reaching a statistic threshold value.

In addition, the method includes the steps of:
in the case of the known process value PW, in the shown exemplary embodiment of 40%, measuring a detector value DW2 of the second type, and
assigning the measured detector value DW2 of the second type to the known process value PW in the calibration assignment KT.

Furthermore, the calibration is performed until in each case a detector value DW2 of the second type has been assigned to different process values PW at intervals from one another that in each case reach an interval maximum value AW, in the shown exemplary embodiment of 10%.

In addition, FIGS. 1 and 7 show the method according to embodiments of the invention for measuring the process value PW of the at least one substance ST by using the apparatus 1, wherein the method includes:
the method for calibrating the apparatus 1 as described above, and
measuring the process value PW by measuring the detector value DW2 of the second type and of determining the process value PW by using the modified calibration assignment KT based on the measured detector value DW2 of the second type, in particular by using the apparatus 1.

FIG. 7 shows a typical energy spectrum of detector values DW, in particular count rate values ZW, as a function of energies, in particular which is measured by the detector device 2. On the horizontal axis, the respective energy GE of the gamma rays GR is plotted in the unit keV, on the vertical axis the respective detector value DW is plotted, in particular the respective count rate value ZW, per energy or energy channel. Here, initially the detector noise is present at small energies, having a noise energy value NE at which the detector noise ends. The detector noise is below the second energy threshold value ETh2. Subsequently or moreover, detector values DW, in particular count rate values ZW, of scattered gamma radiation GR are present, which are at a comparatively low level compared to the detector noise. In the exemplary embodiment shown for the use of Cs-137, for the at least one radiation source S, the Compton gap CG, in which the count rate value ZW becomes nearly zero, begins at approximately 500 keV. The Compton energy value CE lies centrally within this Compton gap CG. Subsequently or moreover, the spectrum also has a peak with a high detector value DW, in particular a high count rate value ZW, which lies at the isotope gamma energy IGE, in the shown exemplary embodiment for the use of Cs-137 for the at least one radiation source S, at 662 keV. These are the non-scattered gamma rays GR. The first energy threshold value ETh1 can be set at the Compton energy value CE, wherein the latter typically marks the boundary between scattered gamma rays GR and non-scattered gamma rays GR. For example, it is thus possible for the FE channel for the detector value DW1 of the first type, in particular the count rate value ZW1 of the first type, to be used only based on energies that are greater than the first energy threshold value ETh1, and for the MK channel all the energies above the second threshold value ETh2 can be used.

In alternative exemplary embodiments, the detector device can have at least one scintillator, in particular at least one organic scintillator, by use of which a measured or detected energy spectrum has a less distinct peak or no peak for a discrete isotope gamma energy. To put it another way: a significant frequency, in particular count rate, may end with the Compton gap.

Since in the exemplary embodiment shown the gamma rays or gamma quanta GR are detected or measured, in particular captured, in the at least one scintillator SZ, both via the photo effect and by way of the Compton scattering, it may be possible that gamma rays GR with full energy IGE also could deposit only a fraction of the energy IGE in the at least one scintillator SZ. As a result, they would be falsely detected as gamma rays GR with too low energy. This effect can be countered by using the detector material with a high density, in particular with elements with a high atomic number Z. Then the photo effect out-weighs the Compton scattering, whereby the full energy, in particular IGE, is detected.

The detector device 2, which can be used for the method described here, can have for example one or more of the following features:
The detector device 2 can resolve for example the, in particular respective, energies of the detected gamma rays GR. Typically, a pulse amplitude is proportional to the energy. However, the energy can also be determined via other methods, for example time-over-threshold.
The detector device 2 can have for example at least one second counter, which can have a low energy threshold, wherein this second counter can register all the detected gamma rays GR.
The detector device 2 can have for example at least one first counter, which can have a higher energy threshold than the second counter and can register only gamma rays GR with a high energy. The energy threshold in this channel can be set for example such that only gamma rays that are incident at the detector device 2 without scattering are registered.

Overall, the described procedure can be used to achieve very good calibration for accurate measurement of process values PW, without the need for particularly time-consuming computer simulations or for establishment of a plurality of process values PW in the system for this purpose.

Compared to other, in particular known, procedures, this represents a significant simplification.

What is claimed is:

1. A method for calibrating an apparatus for measuring a process value of at least one substance, wherein the apparatus comprises a detector device that is configured to measure a detector value by capturing gamma rays that have at least partially penetrated at least the substance, and to produce the detector value based on the captured gamma rays, the method comprising:
in a case of a known process value, measuring a first detector value of a first type based only on captured gamma rays that are not scattered or are slightly scattered,
calculating a calibration assignment based on a process model, wherein the process model is based on a description of the penetration only taking into account unscattered gamma rays, and based on the first detector value of the first type, wherein the calibration assignment assigns a first detector value of the first type to each of different process values,
in a case of at least one unknown process value, measuring the first detector value of the first type and measuring a second detector value of a second type at least based on captured gamma rays that are scattered,
determining the unknown process value by using the calculated calibration assignment based on the first detector value of the first type, and
modifying the calibration assignment by assigning the second detector value of the second type to the determined process value.

2. The method according to claim 1,
wherein the process value is a filling level value or a density value.

3. The method according to claim 1,
wherein the detector value is a count rate value or is dependent on the count rate value.

4. The method according to claim 1, wherein:
the first detector value of the first type is measured based only on captured gamma rays having gamma energies that are the same as or greater than a first energy threshold value, and
the second detector value of the second type is measured at least based on captured gamma rays having gamma energies that are smaller than the first energy threshold value.

5. The method according to claim 1, wherein:
the first detector value of the first type is measured based only on captured gamma rays having gamma energies that are the same as or greater than a first energy threshold value, wherein the first energy threshold value is at least 0.5 times that of, or the same as, a Compton energy value of a Compton gap of the gamma rays.

6. The method according to claim 1, wherein:
the detector device has a detector noise with a noise energy value,
the second detector value of the second type is measured based only on captured gamma rays having gamma energies that are the same as or greater than a second energy threshold value, and
the second energy threshold value is equal to or greater than the noise energy value.

7. The method according to claim 1, further comprising:
emitting gamma rays with a discrete isotope gamma energy into the substance by using at least one radiation source.

8. The method according to claim 6, wherein:
the detector device comprises at least one scintillator for capturing the gamma rays,
and the scintillator has a density of at least one of at least 3 g/cm$^3$ or at most 20 g/cm$^3$.

9. The method according to claim 1, wherein the method further comprises:
in the case of the known process value, measuring the second detector value of the second type, and
assigning the second detector value of the second type to the known process value in the calibration assignment.

10. The method according to claim 9,
wherein calculating the calibration assignment includes normalizing the calibration assignment based on the first detector value of the first type.

11. The method according to claim 9,
wherein the assignment of the second detector value of the second type to the process value is carried out if the second detector value of the second type is measured as reaching a statistic threshold value.

12. The method according to claim 10,
wherein calibration is performed until each second detector value of the second type has been assigned to a different process value at intervals from one another that in each case reach an interval maximum value.

13. A method for measuring a process value of at least one substance by using an apparatus, the method comprising:
a method for calibrating an apparatus for measuring a process value of at least one substance, wherein the apparatus comprises a detector device that is configured to measure a detector value by capturing gamma rays that have at least partially penetrated at least the substance, and to produce the detector value based on the captured gamma rays, the method comprising:
in a case of a known process value, measuring a first detector value of a first type based only on captured gamma rays that are not scattered or are slightly scattered,
calculating a calibration assignment based on a process model, wherein the process model is based on a description of the penetration only taking into account unscattered gamma rays, and based on the first detector value of the first type, wherein the calibration assignment assigns a first detector value of the first type to each of different process values,
in a case of at least one unknown process value, measuring the first detector value of the first type and measuring a second detector value of a second type at least based on captured gamma rays that are scattered,
determining the unknown process value by using the calculated calibration assignment based on the first detector value of the first type, and
modifying the calibration assignment by assigning the second detector value of the second type to the determined process value,
measuring the process value by measuring the second detector value of the second type and determining the process value by using the modified calibration assignment based on the second detector value of the second type.

14. A system comprising:
an apparatus for measuring a process value of at least one substance, wherein the apparatus comprises a method for calibrating an apparatus for measuring a process value of at least one substance, wherein the apparatus comprises a detector device that is configured to measure a detector value by capturing gamma rays that have at least partially penetrated at least the substance, and to produce the detector value based on the captured gamma rays, the method comprising, wherein the system is configured to:

in a case of a known process value, measure a first detector value of a first type based only on captured gamma rays that are not scattered or are slightly scattered, calculate a calibration assignment based on a process model, wherein the process model is based on a description of the penetration only taking into account unscattered gamma rays, and based on the first detector value of the first type, wherein the calibration assignment assigns a first detector value of the first type to each of different process values, in a case of at least one unknown process value, measure the first detector value of the first type and measuring a second detector value of a second type at least based on captured gamma rays that are scattered, determine the unknown process value by using the calculated calibration assignment based on the first detector value of the first type, and modify the calibration assignment by assigning the second detector value of the second type to the determined process value.

15. The system according to claim 14, further comprising at least one of:

a hollow body, or at least one radiation source configured to emit gamma rays having a discrete isotope gamma energy into at least the substance.

* * * * *